(No Model.)
J. W. TAYLOR.
VEGETABLE MINCER.
No. 555,834. Patented Mar. 3, 1896.
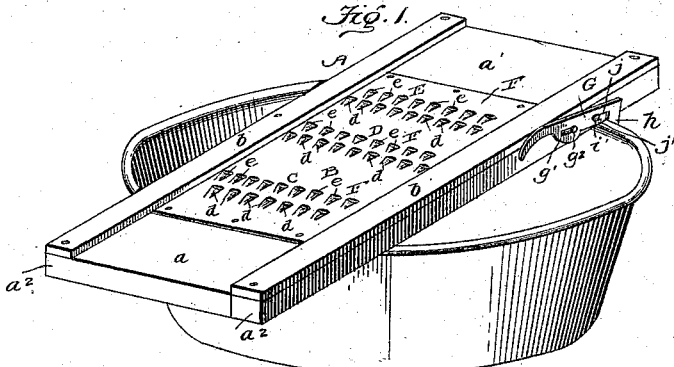
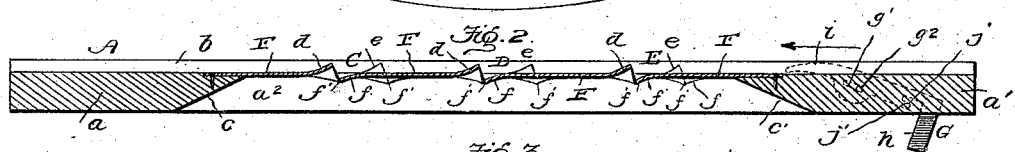
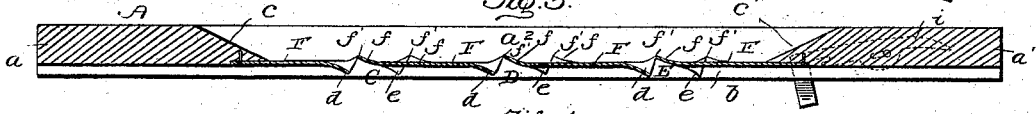
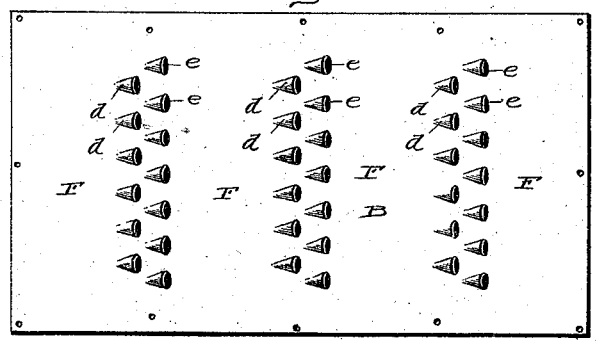
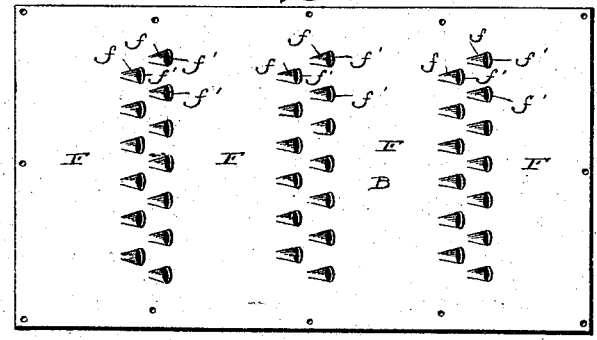
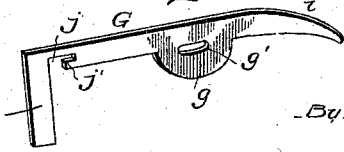
Witnesses
John W. Taylor
— Inventor —
By Edson Bro's
— Att'ys —
ANDREW B. GRAHAM, PHOTO-LITHO, WASHINGTON, D.C.

United States Patent Office.

JOHN W. TAYLOR, OF CAPE GIRARDEAU, MISSOURI, ASSIGNOR OF ONE-HALF TO FRANCIS M. WILLIAMS, OF SAME PLACE.

VEGETABLE-MINCER.

SPECIFICATION forming part of Letters Patent No. 555,834, dated March 3, 1896.

Application filed October 31, 1895. Serial No. 567,505. (No model.)

*To all whom it may concern:*

Be it known that I, JOHN W. TAYLOR, a citizen of the United States, residing at Cape Girardeau, in the county of Cape Girardeau and State of Missouri, have invented certain new and useful Improvements in Vegetable-Mincers; and I do hereby declare the following to be a full, clear, and exact description of the invention, such as will enable others skilled in the art to which it appertains to make and use the same.

My invention relates to improvements in vegetable cutters or graters; and the objects that I have in view are, first, to provide a reversible device capable of being used on both surfaces to grate or reduce the vegetable to coarse or fine particles, as may be desired; secondly, to provide an improved reversible latch to hold the implement in position when either side is adjusted for use, and, thirdly, to simplify and cheapen the construction.

With these and such other ends in view as pertain to a device of this class my invention consists in the novel construction and arrangement of parts, and in the combination of devices which will be hereinafter fully described and claimed.

I have illustrated the preferred embodiment of my invention in the accompanying drawings, forming a part of this specification, in which—

Figure 1 is a perspective view of a vegetable cutter or grater constructed in accordance with my invention, showing the same applied to a vessel. Fig. 2 is a longitudinal sectional view through the implement, showing it in position to expose its coarse side or working surface. Fig. 3 is a like sectional view showing the implement inverted to present its fine side or working surface to the vegetable or other substance and with the latches reversed to hold the implement in position. Figs. 4 and 5 are detail plan views of the metallic plate, showing the two surfaces and the rows of cutters. Fig. 6 is a detail perspective view of one of the reversible latches.

Like letters of reference denote corresponding parts in all the figures of the drawings, referring to which—

A designates the frame of my improved cutter or grater, which consists of the two end pieces, $a\ a'$, and the side pieces, $a^2\ a^2$, all suitably united rigidly together. The side pieces, $a^2$, are flush with the end pieces, $a\ a'$, except where the end pieces are beveled or inclined, as presently described, and to one side of the frame is applied the metallic plate B, which is arranged to lap over the inner edges of the end and side pieces, $a\ a'\ a^2$. This plate B is secured in position by means of the cleats or strips $b$, which are laid upon the side pieces, $a^2$, over the side edges of the plate B, and secured by means of brads, nails or tacks, which are driven through the cleats or strips $b$, the side edges of the plate B, and into the side pieces of the frame A. The ends of the plate B are secured to the end pieces, $a\ a'$, by the nails or brads, as shown.

The plate B lies nearly flush with the end pieces, $a\ a'$, on one side of the implement; but on the other side of the implement the inner edges of the end pieces, $a\ a'$, are beveled, as at $c\ c'$, whereby the implement can be inverted or reversed to enable both surfaces thereof to be used in grating or cutting vegetables or other substances.

The plate B is constructed in a peculiar manner to enable both surfaces thereof to be utilized in reducing the vegetable to a comminuted condition, and to adapt the implement to meet the various requirements of the user in operating on different kinds of vegetables the plate B is so formed as to present a coarse working surface on one side and a fine working surface on its reverse side.

The plate B is punched out to form three groups of cutters, (indicated by the reference-letters C D E,) and these groups are spaced apart a suitable distance from each other to leave the plain smooth surfaces F between the cutters and at the ends of the plate. Each group of cutters consists of two rows of raised lips, (indicated at $d\ e$,) with the lips of the row $e$ arranged alternately with relation to the lips of the row $d$. The lip or cutter is formed by punching out a fragment of the metal plate to leave a hole or aperture substantially oval in form, the metal on one side of the opening being raised to produce on one side of the plate the upwardly-extending convex cutting edge or lip $d$ or $e$, while the metal on the other side of the opening is depressed from the top side of the plate, as at $f$, to produce the cutting-edges $f'$ on the opposite or lower surface of the plate. The edge $f$ of the metal plate is not depresssed to an extent equal to the rise of the edge $d\ e$ on the other side of the opening, and consequently the cutters $f'$ on one side of the plate are not as deep as the cutters $d\ e$ on the reverse side of said plate, and the plate thus has its two working surfaces provided with cutters adapted to reduce vegetables to a coarse or fine comminuted condition. It will be noted that the cutters $f'$ are similarly arranged in groups, with intermediate plain surfaces, and with the rows in alternate or staggered relation, the same as the cutters on the reverse side of the plate. I thus provide an improved grater or slicer which in one plate of metal combines a coarse working surface adapted to reduce a vegetable to a coarse condition, and by reversing the implement, or turning it upside down, the fine grating-surface is brought into position for operation.

In Fig. 2 the implement is shown with its coarse side uppermost, and in use the vegetable is forced down over the end pieces, $a\ a'$, against and over the cutters $d\ e$. It will be noted that when the vegetable has passed over the first two rows of cutters $d\ e$, forming the group C, it will ride on the plain surface F before it reaches the cutters of the group D, and after it passes the two rows of cutters $d\ e$ of group D it rides on the smooth plain surface F of the plate before it reaches the group E.

By providing the plain surfaces F between the groups of cutters, the vegetable is caused to drop down below the plane of the raised edges of the cutters after the vegetable passes one group of cutters and before it is presented to the next group of cutters, and by this organization of devices the vegetable is cut to the best advantage and with speed and ease.

In Fig. 3 the implement is shown in a position the reverse of Fig. 2, with its fine working surface uppermost.

In using the fine side of the implement, as shown by Fig. 3, the vegetable is run or forced over the working surface in the opposite direction to that in which it is forced over the coarse surface, in order that the vegetable may be brought properly against the edges of the smaller or finer cutters $f'$. The vegetable descends the incline $c$ on one piece, $a$, then over the surface of the plate B and in contact with the cutters $f'$ and the plain surfaces thereof and up the incline $c'$ on the other end piece.

I have also devised reversible latches by which the implement is held against endwise movement when either its coarse or fine working surface is presented for operation. The latches are indicated at G G as applied to the sides of the implement near one end thereof. Each latch consists of a plate of metal having a lug $g$ at an intermediate point of its length, a hook $h$ at one end and a curved heel $i$ at the other end. In the plate and lug $g$ is formed a longitudinal slot $g'$, through which passes a headed pin $g^2$, which is fixed in place on one side of the frame, and the latch is adapted to have a limited longitudinal play on this fixed pin to disengage it from the stud $i'$ that holds it in place. The hook $h$ extends at right angles from the shank or plate that forms the latch, and in one edge of this plate, just within the hook, is produced a notch $j$ having an offset forming the lip $j'$.

When the implement is adjusted over a receptacle to present its coarse side $d\ e$ uppermost to reduce the vegetable to a coarse condition, the latches G are turned on the pins $g^2$ to project the hooks $h$ below the implement and bring the heels $i$ in contact with the studs $i'$. As the vegetable is forced over the cutters $d\ e$ in the direction indicated by the arrow in Fig. 2, the implement pulls against the latches G and the hooks $h$ of the latches are brought forcibly against the receptacle to hold the implement from endwise movement while the vegetable is being cut by the coarse lips $d\ e$.

If the implement is reversed, the latches G are turned around so that the pins $i'$ enter the notches $j$, and the latches are slipped endwise to cause the studs $i'$ to enter the offset portions of the notches, the studs fitting between the edges of the shanks and the lips $j'$. The latches are thus held rigidly in place by the studs $g^2\ i'$, and the hooks $h$ project beyond the lower side of the implement, so that it pushes against the hooks, and the latter press against the receptacle to hold it in place when the vegetable is forced over the fine working surface of the plate B.

It is thought that the operation and advantages of my invention will be readily understood and appreciated by those skilled in the art from the foregoing description, taken in connection with the drawings.

Having thus fully described my invention, what I claim as new, and desire to secure by Letters Patent, is—

1. A reversible vegetable cutter or grater having a plate punctured in rows, the corresponding edges of all the punctures on one face of the plate being extended beyond one surface of said plate to produce the coarse curved cutters or lips $d, e$, and the opposite edges of all the punctures being extended beyond the reverse surface of the plate to produce the fine curved cutters or lips $f'$; the two sets of cutters $d, e$ and $f'$ on opposite sides of the plate facing toward opposite ends of said plate, substantially as described, for the purposes set forth.

2. A reversible vegetable cutter or grater consisting of a plate punctured in rows with smooth plain surfaces F between adjacent groups of punctures, the corresponding edges of all the punctures being extended beyond one surface of the plate and forming the curved cutters or lips $d, e$, and the opposite edges of all the punctures being extended beyond the reverse face of the plate, forming the cutters or lips $f'$; the rows of cutters of each group being arranged in alternate or staggered relation to each other, and the two sets of cutters on opposite sides of the plate facing toward the ends of the plate, substantially as described.

3. A reversible vegetable cutter and grater comprising a frame having the end pieces beveled or inclined on one side thereof, and a plate confined within said frame and provided with a coarse working surface on one side and a fine working surface on the opposite side, substantially as described.

4. The combination with a reversible cutter or grater, of a slotted latch connected to the same and provided with a notch at one end, and a stud to confine the latch rigidly in one position and to afford a stop to the heel of the latch when it is reversed, substantially as described.

5. The combination with a reversible cutter or grater, of the slotted latch having the hook and recess at one end and a heel at its other end, the headed pin passing through the slot, and a fixed stud $i$, substantially as described.

In testimony whereof I affix my signature in presence of two witnesses.

JOHN W. TAYLOR.

Witnesses:
J. A. HANSON,
P. C. COOTER.